US008961719B2

(12) United States Patent
Andersin et al.

(10) Patent No.: US 8,961,719 B2

(45) Date of Patent: Feb. 24, 2015

(54) SUPER-HARD STRUCTURE, TOOL ELEMENT AND METHOD OF MAKING SAME

(75) Inventors: Stig Åke Andersin, Robertsfors (SE); Bernd Heinrich Ries, Huenfeld (DE); Frank Friedrich Lachmann, Burghaun (DE); Lars-Ivar Nilsson, Robertfors (SE)

(73) Assignee: Element Six Limited, County Clare (IE)

(*) Notice: Subject to any disclaimer, the term of this patent is extended or adjusted under 35 U.S.C. 154(b) by 0 days.

(21) Appl. No.: 14/116,922

(22) PCT Filed: May 25, 2012

(86) PCT No.: PCT/EP2012/059851

§ 371 (c)(1), (2), (4) Date: Nov. 11, 2013

(87) PCT Pub. No.: WO2012/163838

PCT Pub. Date: Dec. 6, 2012

(65) Prior Publication Data

US 2014/0174633 A1 Jun. 26, 2014

Related U.S. Application Data

(60) Provisional application No. 61/490,836, filed on May 27, 2011.

(30) Foreign Application Priority Data

May 27, 2011 (GB) .................................. 1108975.2

(51) Int. Cl.

*C04B 37/00* (2006.01)
*C03B 29/00* (2006.01)

(Continued)

(52) U.S. Cl.

CPC ............... *C04B 37/001* (2013.01); *C04B 35/52* (2013.01); *C04B 35/5611* (2013.01);

(Continued)

(58) Field of Classification Search

CPC .... C04B 41/00; C04B 35/52; C04B 35/5831; C04B 35/58; B22F 3/24; C23C 16/27

USPC ........................ 51/307, 309, 297; 419/10, 13; 156/89.12, 89.27

See application file for complete search history.

(56) References Cited

U.S. PATENT DOCUMENTS 4,229,186 A 10/1980 Wilson
4,374,651 A * 2/1983 Lee et al. ........................ 51/309

(Continued)

FOREIGN PATENT DOCUMENTS

JP 5139844 6/1993
JP 3948633 2/1995

(Continued)

OTHER PUBLICATIONS

International Search Report for PCT/EP2012/059851 dated Aug. 22, 2012.

(Continued)

*Primary Examiner* — Alex Efta

(74) *Attorney, Agent, or Firm* — Bryan Cave LLP

(57) ABSTRACT

A method for making a treated super-hard structure, the method including providing a super-hard structure comprising super-hard material selected from polycrystalline cubic boron nitride (PCBN) material or thermally stable polycrystalline diamond (PCD) material; subjecting the super-hard structure to heat treatment at a treatment temperature of greater than 700 degrees centigrade at a treatment pressure at which the super-hard material is not thermodynamically stable, for a treatment period of at least about 5 minutes to produce the treated super-hard structure.

22 Claims, 2 Drawing Sheets

10

12

14

(51) Int. Cl.

| | |
|---|---|
| ***C04B 35/52*** | (2006.01) |
| ***C04B 35/56*** | (2006.01) |
| ***C04B 35/58*** | (2006.01) |
| ***C04B 35/581*** | (2006.01) |
| ***C04B 35/5831*** | (2006.01) |
| ***C04B 35/645*** | (2006.01) |
| ***C04B 37/02*** | (2006.01) |
| ***C22C 26/00*** | (2006.01) |
| ***E21B 10/46*** | (2006.01) |
| *B24D 11/00* | (2006.01) |
| *B24D 3/02* | (2006.01) |
| *B22F 7/00* | (2006.01) |
| *C22C 32/00* | (2006.01) |
| *C21D 1/00* | (2006.01) |
| *B22F 1/00* | (2006.01) |
| *C22C 1/04* | (2006.01) |
| *B22F 5/00* | (2006.01) |

(52) U.S. Cl.

CPC ........ *C04B 35/58021* (2013.01); *C04B 35/581* (2013.01); *C04B 35/5831* (2013.01); *C04B 35/645* (2013.01); *C04B 37/021* (2013.01); *C22C 26/00* (2013.01); *E21B 10/46* (2013.01); *C04B 2235/3804* (2013.01); *C04B 2235/3843* (2013.01); *C04B 2235/3847* (2013.01); *C04B 2235/3856* (2013.01); *C04B 2235/386* (2013.01); *C04B 2235/3865* (2013.01); *C04B 2235/3886* (2013.01); *C04B 2235/402* (2013.01); *C04B 2235/427* (2013.01); *C04B 2235/442* (2013.01); *C04B 2235/5436* (2013.01); *C04B 2235/6565* (2013.01); *C04B 2235/6567* (2013.01); *C04B 2235/662* (2013.01); *C04B 2235/785* (2013.01); *C04B 2235/786* (2013.01); *C04B 2235/80* (2013.01); *C04B 2237/36* (2013.01); *C04B 2237/361* (2013.01); *C04B 2237/366* (2013.01); *C04B 2237/401* (2013.01); *C04B 2237/706* (2013.01); *B22F 2005/001* (2013.01)

USPC ......... 156/89.27; 156/89.12; 51/297; 51/307; 51/309; 419/8; 419/13; 419/29; 419/38; 419/48

(56) References Cited

U.S. PATENT DOCUMENTS

| | | | | |
|---|---|---|---|---|
| 5,011,514 | A | 4/1991 | Cho et al. | |
| 5,043,304 | A * | 8/1991 | Yoshida et al. | 501/96.4 |
| 5,453,105 | A | 9/1995 | Middlemiss et al. | |
| 6,179,886 | B1 | 1/2001 | Gordeev et al. | |
| 6,447,852 | B1 | 9/2002 | Gordeev et al. | |
| 6,517,902 | B2 | 2/2003 | Drake et al. | |
| 6,709,747 | B1 | 3/2004 | Gordeev et al. | |
| 6,919,040 | B2 | 7/2005 | Fries et al. | |
| 7,008,672 | B2 | 3/2006 | Gordeev et al. | |
| 7,867,438 | B2 | 1/2011 | Can et al. | |
| 2005/0050801 | A1 * | 3/2005 | Cho et al. | 51/293 |
| 2009/0080986 | A1 * | 3/2009 | Can et al. | 407/119 |

FOREIGN PATENT DOCUMENTS

| | | | |
|---|---|---|---|
| JP | 3960484 | | 2/1995 |
| JP | 7053282 | | 2/1995 |
| JP | 2009-190146 | A | 8/2009 |
| WO | 2009/013713 | A2 | 1/2009 |

OTHER PUBLICATIONS

Search Report for GB1108975.2 dated Sep. 27, 2011.
Search Report for GB1209196.3 dated Sep. 21, 2012.

* cited by examiner

SUPER-HARD STRUCTURE, TOOL ELEMENT AND METHOD OF MAKING SAME

This disclosure relates generally to super-hard structures, tool elements comprising super-hard structures and methods for making same.

Polycrystalline diamond (PCD) material and polycrystalline cubic boron nitride (PCBN) material are examples of super-hard material. PCBN material comprises grains of cubic boron nitride (cBN) material embedded in a matrix, which may comprise metal and or ceramic material. PCD material comprises grains of diamond, a substantial number of which are directly bonded to each other. Super-hard constructions may comprise PCD or PCBN structures integrally formed with a respective cemented carbide substrate. Some super-hard constructions may tend to become dimensionally distorted when processed to form an element for a tool.

U.S. Pat. No. 6,517,902 discloses a form of heat treatment for preform elements having a facing table of polycrystalline diamond bonded to a substrate of cemented tungsten carbide with a cobalt binder. The substrate includes an interface zone with at least 30 per cent by volume of the cobalt binder in a hexagonal close packed crystal structure.

There is provided a method for making a treated super-hard structure, the method including providing a super-hard structure comprising super-hard material selected from polycrystalline cubic boron nitride (PCBN) material or polycrystalline diamond (PCD) material; subjecting the super-hard structure to heat treatment at a treatment temperature of greater than 700 degrees centigrade at a treatment pressure at which the super-hard material is not thermodynamically stable (for example, at which it is metastable), for a treatment period (of time) of at least about 5 minutes to produce the treated super-hard structure.

Various combinations and variations of the method are envisaged by this disclosure, of which the following are non-limiting and non-exhaustive examples.

In example methods, the super-hard structure may be subjected to the heat treatment at an elevated pressure, at ambient pressure or at low pressure or substantially a vacuum. The treatment pressure may be at most about 2 GPa or at most about 1 GPa, or the treatment pressure may be at most ambient pressure (atmospheric pressure) or the pressure may be less than atmospheric pressure (e.g. substantially a vacuum).

The method may include sintering a plurality of grains of super-hard material at an ultra-high pressure and high temperature at which the super-hard material is thermodynamically stable to provide the super-hard structure, in which the grains of the super-hard material are selected from grains comprising diamond or cBN material.

The method may include providing a substrate comprising cemented carbide material, combining a plurality of super-hard grains comprising material selected from diamond or cBN to form an aggregation of the super-hard grains; disposing the aggregation of the super-hard grains adjacent a surface of the substrate to provide a pre-sinter compact; subjecting the pre-sinter compact to an ultra-high pressure and a high temperature at which the material of the super-hard grains is thermodynamically stable and producing a super-hard construction comprising the super-hard structure formed joined to the substrate. In some examples, the super-hard construction may then be subjected to a temperature of at least about 700 degrees centigrade for at least about 5 minutes; and subsequently cut to produce an element for a tool.

The method may include decreasing the pressure from the ultra-high pressure while maintaining the temperature above about 700 degrees centigrade for a period of time, for example at least about 5 minutes. The method may include decreasing the pressure from the ultra-high pressure to a treatment pressure at which the super-hard material is not thermodynamically stable, decreasing the temperature to a treatment temperature above about 700 degrees centigrade for a treatment period of at least about 5 minutes to provide a treated super-hard structure. The method may include decreasing the pressure from the ultra-high pressure to below about 1 GPa while the temperature is maintained in a range from about 700 degrees centigrade to about 1,100 degrees centigrade. The method may include reducing the pressure from the ultra-high pressure to ambient pressure, cooling the super-hard structure to a temperature of less than about 700 degrees centigrade, and then treating the super-hard structure at a temperature of at least about 700 degrees centigrade for the treatment period.

In some examples, the super-hard grains may comprise diamond or cBN, the ultra-high pressure may be at least about 5 GPa, the high temperature may be at least about 1,200 degrees centigrade and the pressure may be decreased to below about 1 GPa or substantially to ambient pressure while the temperature is maintained in a range from about 700 degrees centigrade to about 1,100 degrees centigrade. The pressure may be decreased rapidly. An example method may include reducing the temperature of the super-hard construction to a temperature of at less than about 200 degrees centigrade at a mean cooling rate of at most about 2 degrees centigrade per minute of at most about 1 degree centigrade per minute. An example method may include reducing the pressure from the ultra-high pressure to ambient pressure and cooling the super-hard structure to a temperature of less than about 700 degrees centigrade, and then heating the super-hard structure at a temperature of at least about 700 degrees centigrade for a the treatment period.

The method may include introducing bond material into the aggregation, the bond material being capable of bonding together the super-hard grains directly to each other or by functioning as a matrix in which the super-hard grains are dispersed. The bond material may comprise catalyst material for the super-hard material and or material capable of reacting with the super-hard material. The ultra-high pressure may be at least about 5 GPa and the high temperature is at least about 1,200 degrees centigrade.

In some examples, the super-hard structure may comprise PCBN material comprising or consisting essentially of cBN grains dispersed in a matrix comprising material including Ti and material including Al, the content of the cBN grains being at least about 35 volume per cent or at least about 50 volume per cent and at most about 75 or at most about 90 volume per cent of the PCBN structure. In one version of the example, the matrix may consist of material including Ti and material including Al, apart from unavoidable minor amounts of other material and impurities (i.e. consist essentially of material including Ti and material including Al). In this particular version, the matrix may consist essentially of titanium carbide and or titanium carbonitride, and boride and or nitride of aluminium.

In some examples, the method may include providing a construction comprising a PCBN structure sintered onto a cemented carbide substrate, and heating the construction in a substantially non-oxidising atmosphere to a treatment temperature in the range from about 800 degrees centigrade to 900 degrees centigrade for at least about 30 minutes.

In some examples, the super-hard structure may comprise or consist essentially of a thermally stable polycrystalline diamond (PCD) structure. At least a volume of the PCD structure may exhibit no substantial deterioration of hardness after exposure to a temperature above about 400 degrees centigrade. The PCD structure may contain less than about 2 weight per cent of catalyst metal for diamond in catalytically active form. The interstices between the diamond grains comprised in the PCD material may be substantially empty voids. The interstices of the PCD material may be at least partly filled with ceramic material such as SiC or carbonate compounds. The PCD structure may include a region from which catalyst material for diamond has been depleted.

In some versions of example methods, the treatment period may be split up into shorter periods, i.e. it may comprise sub-periods separated from each other by cooling of the super-hard structure and the cumulative treatment period may be at least about 5 minutes, at least about 15 minutes or at least about 30 minutes.

A method as claimed in any of the above claims, in which the super-hard structure is joined to a substrate comprising cemented carbide material. For example, the super-hard structure may be bonded to the substrate by means of binder material from the cemented carbide material comprised in the substrate. The method may include providing the super-hard structure comprised in a super-hard construction, in which the super-hard structure may be formed joined to a substrate comprising cemented carbide material, and treating the super-hard construction to provide a treated super-hard construction.

In some examples the treatment period may be at least about 15 minutes, at least about 30 minutes or more than 60 minutes. The treatment temperature may be at least about 750 degrees centigrade or at least about 800 degrees centigrade.

The method may include cooling (quenching) the super-hard structure from the treatment temperature at a mean quench rate of at most about 100 degrees centigrade per minute.

The method may include a further treatment including heating the treated super-hard structure or super-hard construction to a temperature of at least about 700 degrees centigrade for a period of at least about 1 minute.

In a particular example of a method for making a treated super-hard construction, a PCBN construction comprising a PCBN structure sintered onto a cemented carbide substrate is provided and treated by heating it in a substantially non-oxidising atmosphere such as a vacuum to a temperature in the range from about 800 degrees centigrade to 900 degrees centigrade for at least about 30 minutes. The temperature may be less than about 1,250 degrees centigrade.

In some example methods, the treated super-hard structure may be cooled to a temperature of at most about 200 degrees centigrade, at most about 100 degrees centigrade or to ambient temperature at mean quench rate of at most about 50 degrees centigrade per second, 20 degrees centigrade per second or at most about 10 degrees centigrade per second. In one version of the method, the super-hard structure may be cooled at a rate of at most about 10 degrees centigrade or at most about 5 degrees centigrade per minute from the treatment temperature to less than about 500 degrees centigrade, and in one version the super-hard structure may be cooled from at most about 600 degrees centigrade to at most about 400 degrees centigrade at about of about 2 degrees centigrade per minute. In one version of the method, the super-hard structure may be allowed to cool more rapidly from at most about 450 degrees centigrade to ambient temperature. In particular examples, the treated super-hard structure may be allowed to cool in air or in nitrogen. The rate of cooling may be varied depending on the temperature of the super-hard structure, and may be increased as the temperature decreases.

n some examples, the super-hard structure may be generally disc-shaped and have a dimension such as a diameter or side length of at least about 20 mm, at least about 40 mm or at least about 60 mm. The combined thickness of the super-hard structure and the substrate may be at least about 1.5 mm, at least about 2 mm and at most about 10 mm or at most about 7 mm. The thickness of the super-hard structure may be at least about 0.5 mm and the thickness of the substrate may be at least about 2 mm. The thickness of the substrate may be at most about 10 mm. In other examples, the treated super-hard structure may have shapes other than disc shapes and may be generally cylindrical or polygonal, for example.

In one example, the method may include processing the treated super-hard structure to form an element for a tool that can be further processed to form an insert for a machine tool or other cutting or drilling tool. For example, the treated super-hard structure may be cut by means of a laser, by electro-discharge machining (EDM) or other means to form an element for a tool, which may be further processed, for example by grinding. Cutting the treated super-hard structure after heat treatment is likely to result in an element for a tool having improved dimensional tolerance as compared to cutting the super-hard structure before heat treatment.

The method may include processing (such as cutting) the treated super-hard structure to form a super-hard element for a tool, such as a machine tool or other cutting or drilling tool.

The method may include providing a super-hard element for a tool, comprising the super-hard structure, heating the super-hard element at a treatment temperature of greater than 700 degrees centigrade for a treatment period (of time) of at least about 1 minute to produce a treated super-hard element.

In some examples, the super-hard structure may be joined to a cemented carbide substrate comprising tungsten carbide (WC) particles and a binder material comprising cobalt (Co), the WC particles having mean size D of at least about 0.5 microns, the content of the WC particles in the substrate being at least about 75 weight per cent or at least about 85 weight per cent and at most about 95 weight per cent, and the content of the binder material in the substrate being at least about 5 weight per cent and at most about 25 weight per cent. In one particular version, the WC particles may have a mean size D of at most about 10 microns. The thermal expansion coefficient of the cemented carbide material may be at least about $5.2\times10^{-6}$/K. The thermal expansion coefficient of the cemented carbide material may be at most about $7\times10^{-6}$/K The treatment temperature may be in the range from about 700 degrees centigrade to about 900 degrees centigrade for a period of time. The treatment period in hours may be at least about $(0.8\times D)-0.15$ and at most about $(4.3\times D)-1.7$. The binder material of the cemented carbide may contain at least about 10 weight per cent tungsten (W) in the form of solid solution or dispersed particles comprising a compound according to the formula $Co_xW_yC_z$, where X is a value in the range from 1 to 7. In one particular version, the substrate may have a magnetic moment (or magnetic saturation) of at least about 70 per cent and or at most about 85 per cent of the theoretical value of binder material comprising nominally pure Co or an alloy of Co and Ni, as the case may be. So for example, where the binder consists substantially of Co, the substrate may have a magnetic saturation of at least about $0.7\times201.9\ \mu T\cdot m^3/kg\times[Co]=[Co]\times141\ \mu T\cdot m^3/kg$; and at most about $0.85\times201.9\ \mu T\cdot m^3/kg\times[Co]=[Co]\times172\ \mu T\cdot m^3/kg$, where [Co] is the weight fraction of Co in the cemented carbide material.

Example cemented carbide material may comprise WC particles having a mean size D in the range from about 4 microns to about 20 microns or to about 10 microns, and may have a magnetic coercive force Hc (in kA/m) of at least about $1.1\times(100\times[Co])^{-1.2}/D+3.3)$, where D is in microns and [Co] is the weight per cent of Co in the cemented carbide material. Other example cemented carbide materials may comprise WC particles having a mean size D in the range from about 0.2 micron to about 4 microns and a magnetic coercive force Hc (in kA/m) of at least about $1.1\times(200\times[Co])^{-1.2}/D+3.3)$, where D is in microns and [Co] is the weight per cent of Co in the cemented carbide material.

Examples treatments are likely to have the aspect of improved dimensional control of super-hard structures, super-hard constructions and or tool elements for a tools obtained from therefrom.

Non-limiting examples are described below with reference to the accompanying drawings, of which:

Figure 1:
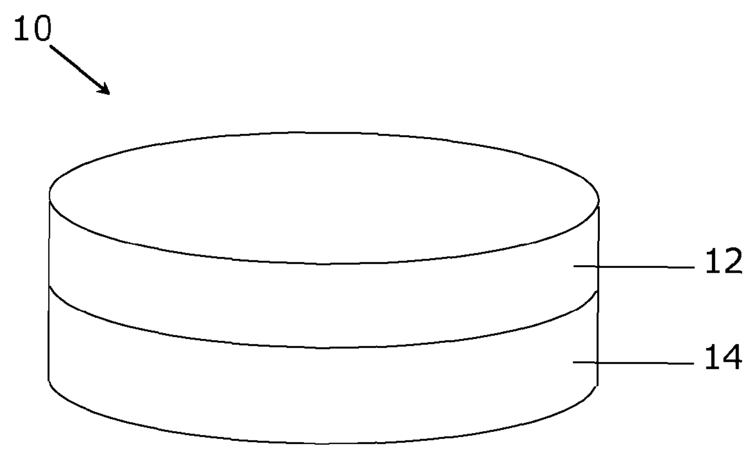
FIG. 1 shows a perspective view of an example super-hard construction.
Figure 2:
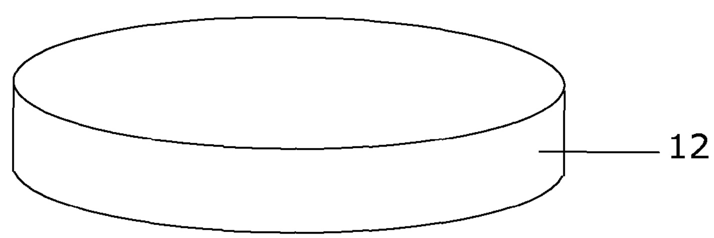
FIG. 2 shows a perspective view of an example free-standing super-hard structure.

With reference to FIG. 1, an example super-hard construction 10 may comprise a super-hard structure 12 formed joined to a cemented carbide substrate 14. With reference to FIG. 2, an example super-hard structure 12 may be free-standing and not joined to a cemented carbide substrate.

Figure 3:
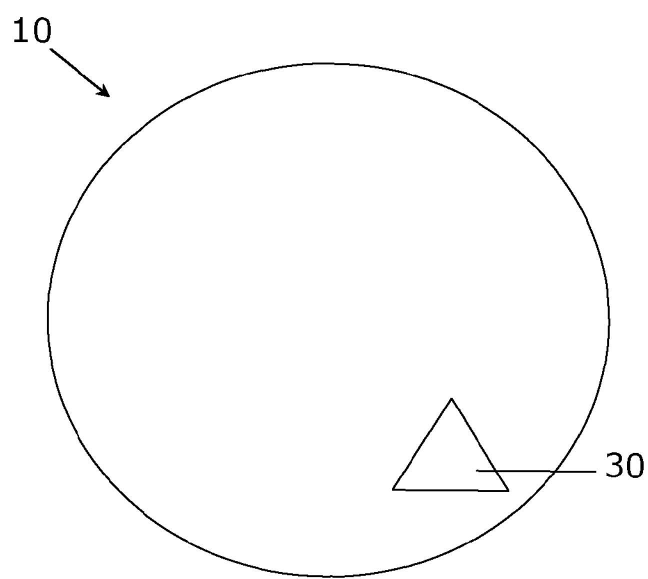
FIG. 3 shows a plan view of an example super-hard structure with and example super-hard element cut therefrom.
Figure 4:
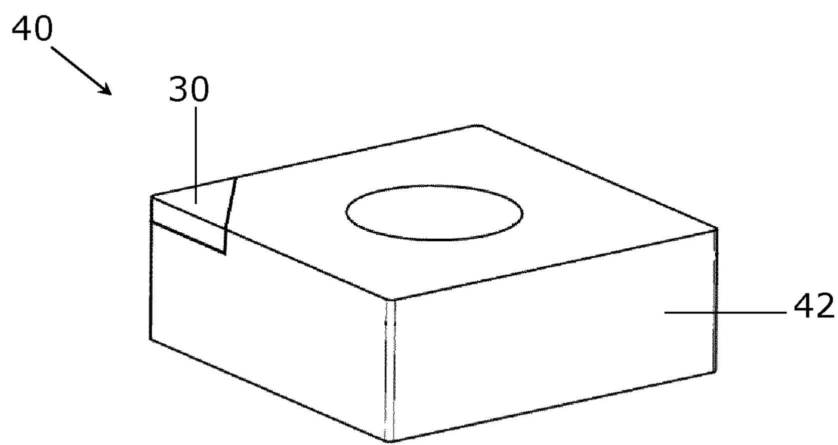
FIG. 4 shows a perspective view of an example tool insert comprising a super-hard element.

With reference to FIG. 3, a treated super-hard structure 10 may be cut and or otherwise processed to produce a super-hard element 30 for a tool insert. FIG. 4 shows a tool insert 40 comprising a super-hard element 30 joined to a carrier body 42.

Example methods of providing PCBN structures can be found in U.S. Pat. No. 7,867,438. In some examples the super-hard structure may be formed joined to a substrate and be comprised in a super-hard construction and in other examples the super-hard structure may be substantially free-standing and not joined to a substrate.

While wishing not to be bound by a particular theory, heat treating the treated super-hard construction as disclosed may have the effect of relieving residual stress within it, which may arise from the difference in thermal expansion properties of the super-hard structure and the substrate. Such difference may even result in the bending of the treated super-hard construction due to the bimetallic effect on cooling of the element after sintering it at an ultra-high pressure and high temperature. Another theory may be that heat treating the treated super-hard construction as disclosed results in micro-structural changes in the cemented carbide substrate, such as the precipitation of very small grains (e.g. nano-sized grains) of certain material phases. If the heat treatment temperature is substantially less than about 700 degrees centigrade, the thermal energy may not be sufficient to produce the benefits and if the time period of the heat treatment is substantially less than about 5 minutes, the extend or degree of the changes produced in the treated super-hard construction may not be sufficient. If the temperature is too high, the super-hard structure may be substantially degraded.

Non-limiting examples are described below in more detail and are summarised in the table below.

| | cBN content, vol. % | cBN mean grain size, micron | Matrix composition | Substrate |
|---|---|---|---|---|
| Example 1 | 65 | 1.0 | Titanium carbonitride, borides of aluminium | 6 wt. % Co cemented WC |
| Example 2 | 60 | 1.2 | Titanium carbonitride, borides of aluminium | 13 wt. % Co cemented WC |
| Example 3 | 50 | 0.7 | Titanium carbonitride, borides of aluminium | 13 wt. % Co cemented WC |
| Example 4 | 50 | 1.2 | Titanium carbide, borides of aluminium | 13 wt. % Co cemented WC |

EXAMPLE 1

A treated super-hard construction comprising a PCBN structure joined to a cemented carbide substrate was provided by a method including sintering cBN grains and matrix material directly onto the substrate. The substrate was in the form of a disc having diameter of about 50 mm and thickness of about 4.5 mm, comprising tungsten carbide (WC) grains having mean size of about 1 micron dispersed within a binder comprising cobalt. The content of the WC grains in the substrate was about 94 weight per cent, the balance of 6 weight per cent being matrix material. The magnetic saturation of the cemented carbide material was in the range from 7.8 $G.cm^3/g$ to 9.5 $G.cm^3/g$, the magnetic coercivity was in the range from 15.1 kA/m to 17.5 kA/m and the thermal expansion coefficient was about $5.4\times10^{-6}/K$ Titanium carbonitride powder was mixed with Al powder, where the weight ratio between the titanium carbonitride and Al powder was 90:10. The powder mixture was heated, pulverised and attrition milled with organic solvent. cBN powder having a mean grain size of about 1 micron was added in a ratio to achieve 65 volume per cent CBN in the mixture. The milled powder contained a minor amount of tungsten carbide from attrition milling, as measured by difference between the weight of milling media before and after attrition milling.

After attrition milling, the slurry was dried under vacuum and formed into a layer on the substrate to form a pre-sinter compact. The pre-sinter compact was assembled into a capsule for an ultra-high press and subjected to a pressure of about 5 GPa and a temperature of about 1,300 degrees centigrade for several minutes to form a construction comprising a sintered layer of PCBN material integrally joined to the substrate, which was allowed to cool to ambient temperature. The PCBN material comprised about 65 volume per cent cBN embedded within a matrix comprising titanium carbo-nitride and borides of aluminium.

The PCBN construction was placed in a furnace under a vacuum and heated over a period of about 120 minutes to a temperature of about 850 degrees centigrade, which temperature was maintained for about 60 minutes. The temperature was then reduced over a period of about 350 minutes to about 500 degrees centigrade, then over about 5 minutes to about 490 degrees centigrade, and finally nitrogen gas was bled into the furnace and the PCBN element cooled to ambient temperature.

EXAMPLE 2

A PCBN construction was provided as in Example 1 except that the content of the cBN grains in the PCBN layer was about 60 volume per cent and the cBN grains had a mean size of about 1 micron, and the content of the WC grains in the substrate was about 87 weight per cent, the balance of 13 weight per cent being matrix material. The magnetic saturation of the cemented carbide material was in the range from 18.4 G.cm$^3$/g to 20 G.cm$^3$/g, the magnetic coercivity was in the range from 9 kA/m to 10.5 kA/m and the thermal expansion coefficient was about $6.8\times10^{-6}$/K

EXAMPLE 3

A PCBN construction was provided as in Example 1 except that the content of the cBN grains in the PCBN layer was about 50 volume per cent and the cBN grains had a mean size of about 1 micron, and the content of the WC grains in the substrate was about 87 weight per cent, the balance of 13 weight per cent being matrix material.

EXAMPLE 4

A treated super-hard construction comprising a PCBN structure joined to a cemented carbide substrate was provided by a method including sintering cBN grains and matrix material directly onto the substrate. The substrate was in the form of a disc having diameter of about 50 mm and thickness of about 4.5 mm, comprising tungsten carbide (WC) grains dispersed within a binder comprising cobalt. The content of the WC grains in the substrate was about 87 weight per cent and the balance of about 13 weight per cent was binder material.

Titanium carbonitride powder was mixed with Al powder, where the weight ratio between the titanium carbonitride and Al powder was 90:10. The powder mixture was heated, pulverised and attrition milled with organic solvent. CBN powder having a mean size of about 1 micron was added in a ratio to achieve 50 volume per cent CBN in the mixture and the mixture was then further attrition milled. After attrition milling, the slurry was dried and formed into a green compact.

After attrition milling, the slurry was dried under vacuum and formed into a layer on the substrate to form a pre-sinter compact. The pre-sinter compact was assembled into a capsule for an ultra-high press and subjected to a pressure of about 5 GPa and a temperature of about 1,300 degrees centigrade for several minutes to form a sintered layer of PCBN material integrally joined to the substrate. The PCBN material comprised about 50 volume per cent cBN embedded within a matrix comprising titanium carbo-nitride and borides of aluminium.

Certain terms as used herein are briefly explained below.

As used herein, "super-hard" or ultra-hard material has Vickers hardness of at least about 25 GPa. Synthetic and natural diamond, polycrystalline diamond (PCD), cubic boron nitride (cBN) and polycrystalline cBN (PCBN) material are examples of super-hard materials. Synthetic diamond, which is also called man-made diamond, is diamond material that has been manufactured. A PCD structure comprises or consists essentially of PCD material and a PCBN structure comprises or consists essentially of PCBN material. Other examples of super-hard materials include certain composite materials comprising diamond or cBN grains held together by a matrix comprising ceramic material, such as silicon carbide (SiC), or by cemented carbide material such as Co-bonded WC material (for example, as described in U.S. Pat. Nos. 5,453,105 or 6,919,040). For example, certain SiC-bonded diamond materials may comprise at least about 30 volume per cent diamond grains dispersed in a SiC matrix (which may contain a minor amount of Si in a form other than SiC). Examples of SiC-bonded diamond materials are described in U.S. Pat. Nos. 7,008,672; 6,709,747; 6,179,886; 6,447,852; and International Application publication number WO2009/013713).

PCBN material comprises grains of cubic boron nitride (cBN) dispersed within a matrix comprising metal or ceramic material. For example, PCBN material may comprise at least about 35 volume per cent or at least about 50 volume per cent cBN grains dispersed in a matrix material comprising a Ti-containing compound, such as titanium carbide, titanium nitride, titanium carbonitride and/or an Al-containing compound, such as aluminium nitride, and/or compounds containing metal such as Co and/or W. Some versions (or "grades") of PCBN material may comprise at least about 80 volume per cent or even at least about 90 volume per cent cBN grains.

Polycrystalline diamond (PCD) material comprises a mass (i.e. an aggregation of a plurality) of diamond grains, a substantial portion of which are directly inter-bonded with each other and in which the content of diamond is at least about 80 volume per cent of the material. Interstices between the diamond grains may be at least partly filled with a binder material comprising catalyst material for synthetic diamond, or they may be substantially empty. A catalyst material for synthetic diamond is capable of promoting the growth of synthetic diamond grains and or the direct inter-growth of synthetic or natural diamond grains at a temperature and pressure at which synthetic or natural diamond is thermodynamically stable. Examples of catalyst materials for diamond are Fe, Ni, Co, Mn and certain alloys including these. Super-hard structures comprising PCD material may comprise at least a region from which catalyst material has been removed from the interstices, leaving interstitial voids between the diamond grains. PCD material may be made by a process including providing an aggregate mass of diamond grains having a size distribution suitable for the grade, optionally introducing catalyst material or additive material into the aggregate mass, and subjecting the aggregated mass in the presence of a source of catalyst material for diamond to a pressure and temperature at which diamond is more thermodynamically stable than graphite and at which the catalyst material is molten. Under these conditions, molten catalyst material may infiltrate from the source into the aggregated mass and is likely to promote direct intergrowth between the diamond grains in a process of sintering, to form a PCD structure. The aggregate mass may comprise loose diamond grains or diamond grains held together by a binder material. Different PCD grades may have different microstructure and different mechanical properties, such as elastic (or Young's) modulus E, modulus of elasticity, transverse rupture strength (TRS), toughness (such as so-called K1C toughness), hardness, density and coefficient of thermal expansion (CTE). Different PCD grades may also perform differently in use. For example, the wear rate and fracture resistance of different PCD grades may be different.

Thermally stable PCD material comprises at least a part or volume of which exhibits no substantial structural degradation or deterioration of hardness or abrasion resistance after exposure to a temperature above about 400 degrees centigrade, or even above about 700 degrees centigrade. For example, PCD material containing less than about 2 weight per cent of catalyst metal for diamond such as Co, Fe, Ni, Mn in catalytically active form (e.g. in elemental form) may be thermally stable. PCD material that is substantially free of catalyst material in catalytically active form is an example of thermally stable PCD. PCD material in which the interstices are substantially voids or at least partly filled with ceramic material such as SiC or salt material such as carbonate compounds may be thermally stable, for example. PCD structures having at least a significant region from which catalyst material for diamond has been depleted, or in which catalyst material is in a form that is relatively less active as a catalyst, may be described as thermally stable PCD.

As explained above, PCD material and PCBN material may be provided by sintering a plurality of diamond or cBN grains respectively in the presence of a suitable binder or catalyst material onto a substrate, such as a cemented carbide substrate. The PCD or PCBN structure thus produced is likely to be formed joined to the substrate, being an integral part of a construction comprising the PCD or PCBN structure bonded to the substrate during the process in which the respective structure formed into a sintered body.

Cemented carbide material comprises particles of metal carbide such as tungsten carbide (WC) or titanium carbide (TiC) dispersed within a binder material comprising a metal such as cobalt (Co), nickel (Ni) or metal alloy. The binder phase may be said to cement the carbide particles together as a sintered compact. Cemented carbide materials may have various compositions. In some examples, the cemented carbide material may contain at least about 0.1 weight per cent to about 10 weight per cent vanadium (V), chromium (Cr), tantalum (Ta), titanium (Ti), molybdenum (Mo), niobium (Nb) and or hafnium (Hf), which may be in the form of a solid solution in the binder material and or in the carbide form. Nanoparticles may be dispersed in the binder material and may comprise V, Cr, Ta, Ti, Mo, Nb and or Hf. In some examples, the cemented carbide may contain at least 0.01 weight per cent and at most 5 weight per cent of one or more metals selected from Ru, Rh, Pd, Re, Os, In, and or Pt. Measurements of magnetic properties may be used to measure indirectly aspects of the microstructure and properties of cemented carbide materials. The magnetic coercive force (or simply coercive force or coercivity) and magnetic moment (or magnetic saturation) are used for such purposes.

The invention claimed is:

1. A method for making a heat treated polycrystalline cubic boron nitride (PCBN) structure, the method including providing a substrate comprising cemented carbide material;

combining a plurality of super-hard grains comprising cubic boron nitride (cBN) material to form an aggregation of the cBN grains;

disposing the aggregation adjacent a surface of the substrate to provide a pre-sinter compact;

subjecting the pre-sinter compact to an ultra-high pressure of at least 5 gigapascals (GPa) and a high temperature of at least 1,200 degrees centigrade, at which the cBN material is thermodynamically stable; and thus providing a polycrystalline cubic boron nitride (PCBN) structure joined to the substrate, the PCBN structure comprising PCBN material;

decreasing the pressure from the ultra-high pressure to a treatment pressure of at most 2 GPa at which the PCBN material is not thermodynamically stable, decreasing the temperature and then maintaining the temperature at a treatment temperature of greater than 700 degrees centigrade for a treatment period of at least 5 minutes to produce the heat treated PCBN structure.

2. A method as claimed in claim 1, including decreasing the pressure from the ultra-high pressure to the treatment pressure of less than 1 GPa while the temperature is maintained at the treatment temperature in a range from 700 degrees centigrade to 1,100 degrees centigrade.

3. A method as claimed in claim 1, in which the PCBN structure comprises PCBN material comprising cBN grains dispersed in a matrix comprising material including Ti and material including Al, the content of the cBN grains being at least 35 volume per cent of the PCBN material.

4. A method as claimed in claim 1, the method including a further heat treatment step, in which the heat treated PCBN structure is heated in a substantially non-oxidising atmosphere to a treatment temperature in the range from 800 degrees centigrade to 900 degrees centigrade for at least 30 minutes.

5. A method as claimed in claim 1, in which the treatment period is split up into sub-periods separated from each other by cooling of the super-hard structure, the cumulative treatment period being at least 5 minutes.

6. A method as claimed in claim 1, including a further treatment including heating the treated PCBN structure to a temperature of at least 700 degrees centigrade for a period of at least 1 minute.

7. A method as claimed in claim 1, in which the PCBN structure is disc-shaped and has a diameter of at least 20 mm.

8. A method as claimed in claim 1, in which the PCBN structure is joined to a substrate and the combined thickness of the PCBN structure and the substrate is at least 1.5 mm.

9. A method as claimed in claim 1, in which the PCBN structure is joined to a substrate and the thickness of the PCBN structure is at least 0.5 mm and the thickness of the substrate is at least 2 mm.

10. A method as claimed in claim 1, in which the PCBN structure is joined to a cemented carbide substrate comprising tungsten carbide (WC) particles and a binder material comprising cobalt (Co), the WC particles having mean size D of at least 0.5 microns, the content of the WC particles in the substrate being at least 75 weight per cent and at most 95 weight per cent, and the content of the binder material in the substrate being at least 5 weight per cent and at most 25 weight per cent.

11. A method as claimed in claim 1, including processing the treated PCBN structure to form an element for a tool.

12. A method for making a heat treated polycrystalline cubic boron nitride (PCBN) structure, the method including:

providing a substrate comprising cemented carbide material;

combining a plurality of super-hard grains comprising cubic boron nitride (cBN) material to form an aggregation of the cBN grains;

disposing the aggregation adjacent a surface of the substrate to provide a pre-sinter compact;

subjecting the pre-sinter compact to an ultra-high pressure of at least 5 gigapascals (GPa) and a high temperature of at least 1,200 degrees centigrade, at which the cBN material is thermodynamically stable; and thus providing a polycrystalline cubic boron nitride (PCBN) structure joined to the substrate, the PCBN structure comprising PCBN material;

reducing the pressure from the ultra-high pressure to atmospheric pressure, cooling the PCBN structure to a temperature of less than 700 degrees centigrade, and then heating the PCBN structure to a treatment temperature of at least 700 degrees centigrade for a treatment period of at least 5 minutes at a treatment pressure of at most 2 GPa to produce the heat treated PCBN structure.

13. A method as claimed in claim 12, including decreasing the pressure from the ultra-high pressure to the treatment pressure of less than 1 GPa while the temperature is maintained at the treatment temperature in a range from 700 degrees centigrade to 1,100 degrees centigrade.

14. A method as claimed in claim 12, in which the PCBN structure comprises PCBN material comprising cBN grains dispersed in a matrix comprising material including Ti and material including Al, the content of the cBN grains being at least 35 volume per cent of the PCBN material.

15. A method as claimed in claim 12, the method including heating the PCBN structure to a treatment temperature in the range from 800 degrees centigrade to 900 degrees centigrade for at least 30 minutes.

16. A method as claimed in claim 12, in which the treatment period is split up into sub-periods separated from each other by cooling of the super-hard structure, the cumulative treatment period being at least 5 minutes.

17. A method as claimed in claim 12, including a further treatment including heating the treated PCBN structure to a temperature of at least 700 degrees centigrade for a period of at least 1 minute.

18. A method as claimed in claim 12, in which the PCBN structure is disc-shaped and has a diameter of at least 20 mm.

19. A method as claimed in claim 12, in which the PCBN structure is joined to a substrate and the combined thickness of the PCBN structure and the substrate is at least 1.5 mm.

20. A method as claimed in claim 12, in which the PCBN structure is joined to a substrate and the thickness of the PCBN structure is at least 0.5 mm and the thickness of the substrate is at least 2 mm.

21. A method as claimed in claim 12, in which the PCBN structure is joined to a cemented carbide substrate comprising tungsten carbide (WC) particles and a binder material comprising cobalt (Co), the WC particles having mean size D of at least 0.5 microns, the content of the WC particles in the substrate being at least 75 weight per cent and at most 95 weight per cent, and the content of the binder material in the substrate being at least 5 weight per cent and at most 25 weight per cent.

22. A method as claimed in claim 12, including processing the treated PCBN structure to form an element for a tool.

* * * * *